United States Patent
Agarwal et al.

(10) Patent No.: US 6,175,438 B1
(45) Date of Patent: Jan. 16, 2001

(54) DIFFERENTIAL OPTICAL SIGNAL RECEIVER

(75) Inventors: Diwakar Agarwal, Stanford, CA (US); Ashok V. Krishamoorthy, Middletown Township; Ted Kirk Woodward, Holmdel Township, both of NJ (US)

(73) Assignee: Lucent Technologies, Inc., Murray Hill, NJ (US)

( * ) Notice: Under 35 U.S.C. 154(b), the term of this patent shall be extended for 0 days.

(21) Appl. No.: 09/040,885

(22) Filed: Mar. 18, 1998

(51) Int. Cl.$^7$ .................................................. H04B 10/06
(52) U.S. Cl. ..................... 359/189; 250/214 A; 330/308
(58) Field of Search ............................. 359/189, 158, 359/163, 154; 330/308; 250/214 A

(56) References Cited

U.S. PATENT DOCUMENTS

| | | | |
|---|---|---|---|
| 5,105,293 | * 4/1992 | Bortolini | 359/154 |
| 5,473,461 | * 12/1995 | Miremadi | 359/189 |
| 5,612,810 | * 3/1997 | Inami et al. | 359/189 |
| 5,822,104 | * 10/1998 | Saito | 359/189 |
| 6,064,507 | * 5/2000 | Heflinger et al. | 359/189 |

* cited by examiner

Primary Examiner—Kinfe-Michael Negash
(74) Attorney, Agent, or Firm—John A. Caccuro

(57) ABSTRACT

A differential optical signal receiver includes an interference-rejecting circuit to provide enhanced interference signal rejection. The differential optical signal receiver includes a differential optical signal detector for detecting a received differential optical signal and converting it to a differential electrical signal. An interference-rejecting differential electrical circuit, including a common source load, processes the differential electrical signal so as to reject any electrical interference signal other than said differential electrical signal.

15 Claims, 3 Drawing Sheets

DIFFERENTIAL OPTICAL SIGNAL RECEIVER

TECHNICAL FIELD OF THE INVENTION

This invention relates to optical signal receivers and, more particularly, to a differential optical signal receiver having an interference-rejecting circuit.

BACKGROUND OF THE INVENTION

Optical signals are increasingly being used to communicate between electronic processing elements. In certain applications, large amounts of information need to be processed together, thereby creating a need to process many optical signals. If such processing is to be done electronically, it is necessary to convert large numbers of optical signals to electrical signals, and then to process the resulting electrical information. Particularly if this processing is done with integrated optical receiver arrays, the receiver is subject to interference from a wide range of potential sources. What is desired is an optical receiver having improved interference-rejection capabilities so as to reject the interference arising from various electronic sources.

SUMMARY OF THE INVENTION

The present invention is directed to solving the prior art interference problems using an a differential optical signal receiver having an interference-rejecting circuit.

More particularly, a differential optical signal receiver is disclosed comprising (1) a differential optical signal detector for detecting a received differential optical signal and converting it to a differential electrical signal and (2) a differential electrical circuit, including a common source load, for processing the differential electrical signal so as to reject any electrical interference signal other than the differential electrical signal. According to another aspect of the invention, the differential electrical circuit includes a differential transimpedance preamplifier connected to receive and amplify the differential electrical signal. In another aspect the differential electrical circuit further includes a differential amplifier circuit connected to receive output signals from the differential transimpedance preamplifier.

In one embodiment of the differential optical signal receiver, the differential electrical circuit and the differential amplifier circuit are integrated together on a common chip. The devices utilized in the chip may be Field Effect Transistors (FETs) which may be fabricated using Complementary Metal Oxide Semiconductor (CMOS) technology or other comparable Very Large Scale Integration (VLSI) technology.

DETAILED DESCRIPTION

Figure 1:
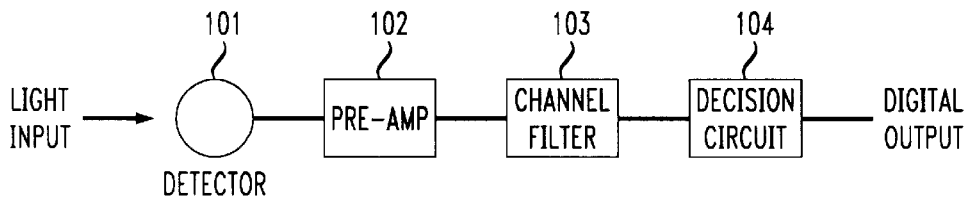
FIG. 1 shows a block diagram of a prior art optical signal receiver.

In the following description, each item or block of each figure has a reference designation associated therewith, the first number of which refers to the figure in which that item is first located (e.g., 101 is located in FIG. 1). When the description references the prior work of the inventors and others, such references will be designated by a bracketed number [2] which indicates the reference citation location in the Appendix.

Optical receivers typically contain several distinct and identifiable elements. These are described in many references.[6,7] Such a prior-art receiver is shown the block diagram in FIG. 1. The light signal is received and converted to an electrical signal in detector 101, amplified in pre-amplifier 102, filtered in channel filter 103, and a converted to a digital output signal in decision circuit 104. On occasion, a post-amplifier, not shown, may be inserted after the Pre-Amp 102.

The integration of large numbers of optical inputs and outputs to CMOS VLSI circuits is well known.[2,3] Such integration is attractive for various reasons, not the least of which is the ability to bring large amounts of information onto and off of the VLSI chip—a task that becomes increasingly difficult to do electronically as the complexity and speed of the CMOS VLSI increases. In CMOS VLSI, there are large numbers of digital processing elements, and these elements are fabricated in a conducting substrate, being isolated from one another by p-n junctions.[5] During the course of their operation, these digital elements generate spurious signals. The CMOS VLSI chip has a plethora of these signals and represents a very 'noisy' environment. Some of the effects are summarized below, and more may be found in various references[5,1]

injection of minority and majority carriers into the substrate transient deviations from the power supply potential on wires connecting the elements to external supplies transient deviations from ground potential on wires connecting the elements to ground potential.

radiation from rapidly moving charges inductive coupling of currents flowing in signal, ground, and power lines on the chip.

capacitive coupling of voltage signals between wires on the chip.

In particular, supply and ground noise are important sources of interference because they can grow by coupling through linear amplifiers and cause signal corruption. These sources of interference can be tolerated by the digital logic because of the thresholding and regenerative properties of the logic elements.[5]

On the other hand, an optical receiver is intended to convert relatively small optical signals into full-logic-level signals, suitable for further processing by the digital logic that may be surrounding it. Necessarily then, the optical receiver would also be sensitive to these interfering nearby digital logic sources. Such interference may corrupt the received signal and it is therefore desirable to shield the receiver, as much as possible, from these sources. Even in the absence of digital processing circuitry, the receiver may be subject to interference from neighboring receivers, particularly if such receivers are integrated together on the same semiconductor substrate. Such interference from neighboring receiver elements is often referred to as 'crosstalk'.

In accordance with the present invention, we have recognized that if a received optical signal could be made available as a complementary optical signal, a differential optical signal receiver can be designed to reject the interference arising from the various electronic sources. In particular, our differential optical signal receiver includes an interference-rejecting element, which greatly reduces the interference arising from electrical sources present nearby the receiver. This receiver is resistant to interference from digital logic sources and crosstalk from adjacent receivers, particularly noise coupled from power supply and ground lines. While the interference-rejecting stage of our receiver performs this function, to fully take advantage of this stage, it was necessary to re-design other stages of the receiver.

Figure 2:
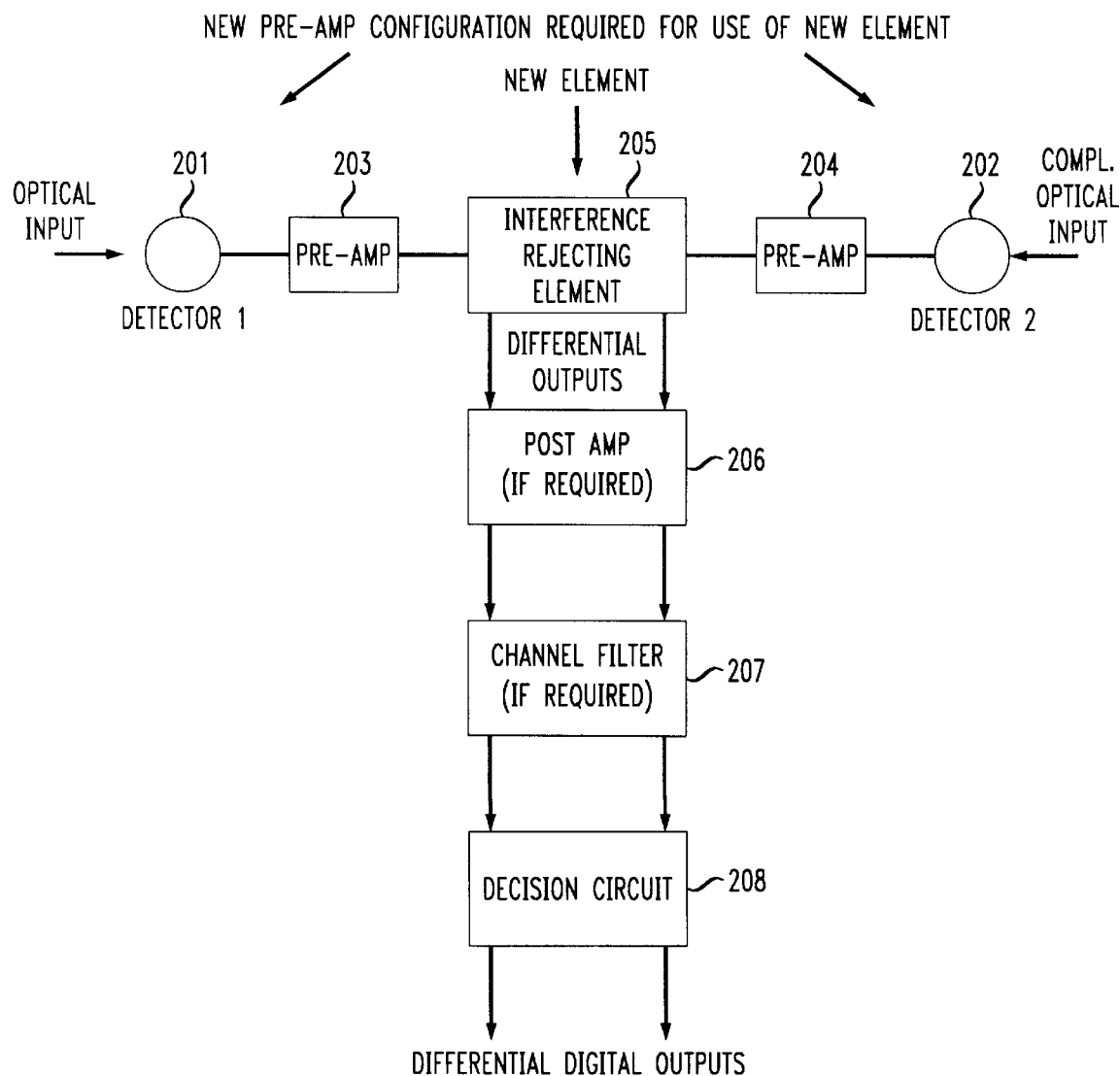
FIG. 2 shows an illustrative block diagram of our differential optical signal receiver.

With reference to FIG. 2 we describe a block diagram of our differential optical signal receiver. As shown, complementary optical input signals are applied to detectors 201 and 202. The resulting differential electrical signals are amplified by pre-amplifiers 203 and 204, respectively and applied to the interference rejecting element or stage 205. The pre-amplifiers 203 and 204 are each single-ended transimpedance amplifiers which convert an input current from the respective detector diode, 301 and 302, to a voltage signal for input to Q1 and Q3, respectively. If required a post-amplifier 206 and channel filter 207 are utilized. The differential signal is then digitized in decision circuit 208 to obtain the differential digital outputs.

Our interference/crosstalk rejecting optical receiver is based on the principles of differential amplifiers, which reject common-mode signals. These principles are well described in various textbooks.[4] To reject signal variations imposed by supply noise, it is therefore desirable to cause those variations to appear in the common-mode of a differential amplifier, and thereby be rejected in the signal output of the amplifier, when that output is taken as the difference between the complementary outputs of the amplifier. For common-mode rejection, it is particularly important that the response of the two sides of the differential amplifier be properly balanced. Thus, for example, the commonly used practice of biasing the load elements of a CMOS differential amplifier with a current mirror technique is inappropriate here and results in poor interference rejection in simulation. [4]

To take advantage of the differential amplifier, it is necessary to provide signals to both sides of the amplifier. It is further necessary to properly bias the amplifier. If the receiver is used for processing digital information without special coding, it is desirable that this biasing be obtained without ac-coupling between stages of the receiver.

Figure 3:
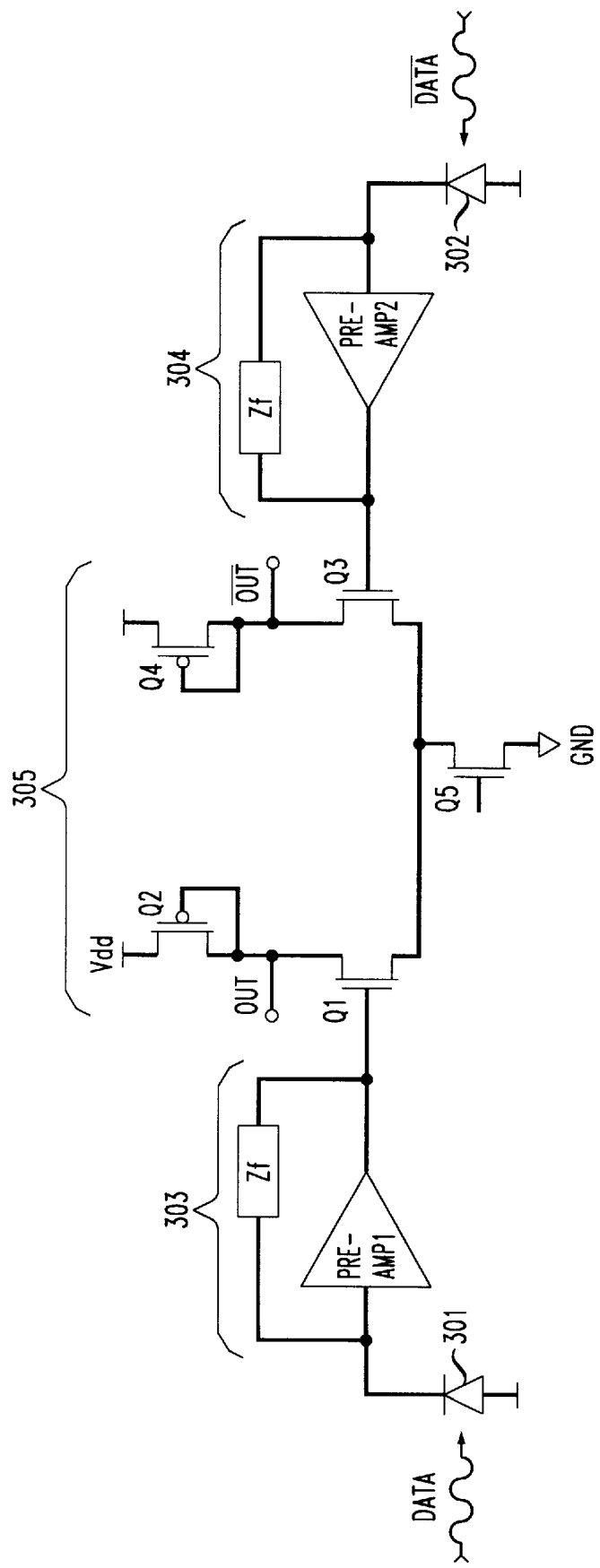
FIG. 3 shows a first illustrative arrangement of our interference-rejecting differential amplifier.

With reference to FIG. 3, the above goals are achieved by feeding the inputs of the differential amplifier 305 from two (optional) pre-amplifiers, 303 and 304, each of which is driven by an input photodiode, 301 and 302, that is, in turn, driven by a differential pair of optical input data signals. If the input preamplifiers 303 and 304 are located nearby one another, they will experience similar levels of electrical interference, which will be similarly amplified and rejected by the interference-rejecting differential amplifier stage 305. This crosstalk-reduction stage 305 gives rise to a differential electrical signal, which is known to be more robust against interference than a single-ended electrical signal.

The operation of crosstalk-reduction stage 305 is as follows. The input Field Effect Transistors (FETS) Q1 and Q3 share a common source impedance, FET Q5. Note a FET is assumed to have a negative gate and a positive gated FET is denoted PFET. The FETs may be fabricated using Complementary Metal Oxide Semiconductor (CMOS) technology or using other comparable Very Large Scale Integrated (VLSI) circuit technology.

In response to differential input signals applied to the gates of Q1 and Q3, the FET Q5 exhibits a very low small signal impedance. As a result a significant differential signal current flows in Q1 and Q3, producing a substantial differential output voltage (across the OUT and OUT bar leads) at their respective load impedances. Since it is difficult to form resistors in CMOS technology, a diode impedance (formed by the PFETs Q2 and Q5 connected as diodes) is utilized. Thus, crosstalk reduction stage 305 produces a substantial gain to differential input signals.

However, crosstalk-reduction stage 305 also provides significant attenuation to common mode input signals to Q1 and Q3. Significant attenuation in stage 305 also occurs to any commonly inducted or coupled signals caused by supply voltage or ground lead based noise or interference signals. This reduction occurs because when a common mode signal is applied to Q1 and Q3, the common source impedance, FET Q5, is substantial, resulting in a greatly diminished common mode current flow in Q1 and Q3. The result is that almost no output common mode signal develops across the load diodes Q2 and Q4. Moreover, since the output is taken as a differential voltage (across the OUT and OUT bar leads), there is almost no differential output signal from stage 305 caused by a common mode input signal or any other commonly induced or coupled signal.

For the same reason, it is desirable to maintain differential electrical signals and circuits for the remainder of the receiver processing, e.g., in the post-amplifier, channel filter and decision circuits of FIG. 2. The implementation of these circuits may utilize the same differential circuit techniques described above.

As already noted, the interference-rejecting properties of this receiver are most effective when the pre-amplifiers are physically close e.g., integrated together) to one another, so that they may experience substantially the same interference signals. This is because the interference rejection is perfect only if the interference experienced by the two photo-diode/preamp combinations, 301/303 and 302/304, are exactly the same. Moreover, if the preamplifiers, 303 and 304, are combined with the differential amplifier, 305, the rejection property may be expected to further improve. Note, if photodiodes 301 and 302 are implemented using a incompatible technology (e.g., Gallium Arsenide GaAs), they cannot be readily integrated together with the CMOS technology of the preamplifier 303 and 304 and differential amplifier 305 circuits. However, a photodiodes 301 and 302 chip can be mounted (e.g.,by flip-chip bonding) on a hybrid chip together with a CMOS chip.

Figure 4:
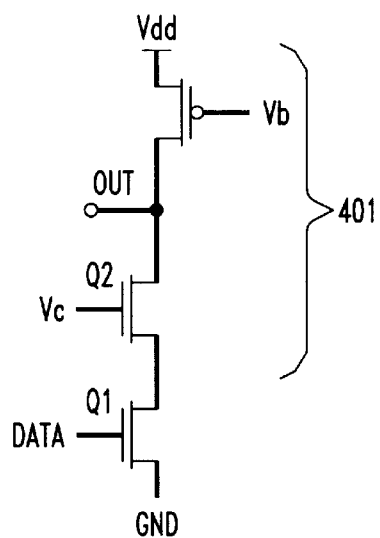
FIG. 4. shows an illustrative cascode-based interference-rejecting preamplifier.

An alternative crosstalk-reducing element is a cascode amplifier configuration although it is has been found to be less effective than the differential amplifier element. Such a cascode amplifier configuration is shown in FIG. 4. The particular type of interference that is rejected by this cascode element 401 are spurious signals on the supply and ground leads of the amplifier. The interference rejecting properties of the cascode element 401 are not immediately apparent, and derive primarily from its biasing technique. Some bias must be applied to the gate of the cascode FET (Vc in the FIG.4). If this bias is derived from the same supply, VDD, and ground voltage used by the rest of the circuit, it would contains the same variations (e.g., interference signals) as those present on supply and ground. As a result this type of biasing would provide some interference cancellation in the circuit. As a result it provides a 'screening' effect on the output signal. Similar supply noise rejection effects are obtained when the load element (the PFET biased with Vb as shown in FIG. 4) is considered. The cascode circuit 401 may be substituted for both of the diode load impedances Q2 and Q4 of differential amplifier, 305, of FIG. 3 to provide further rejection of spurious signals that exist on the supply, VDD, and ground, GND, voltages.

Figure 5:
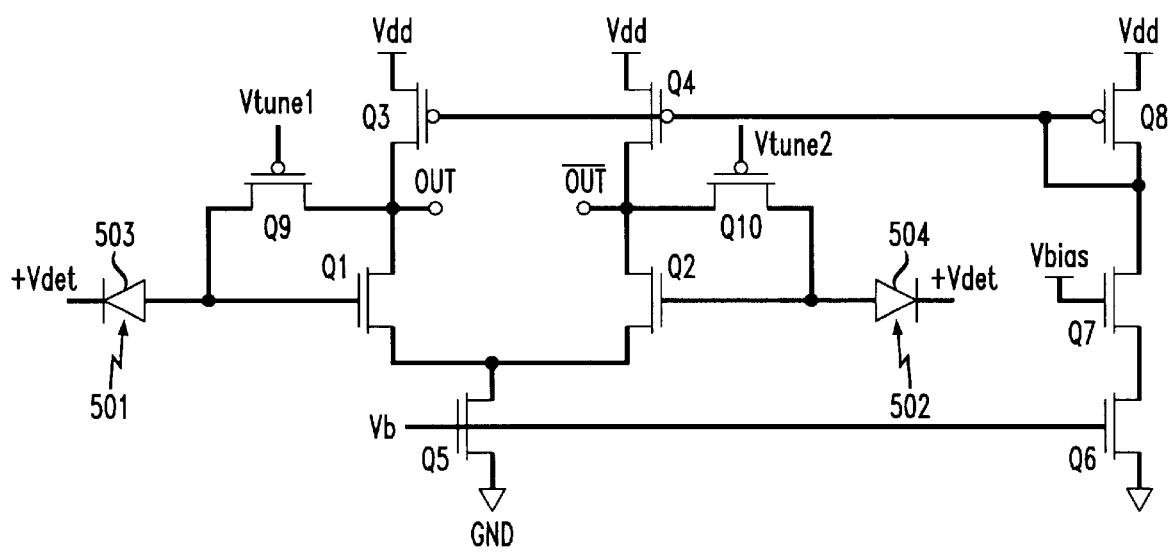
FIG. 5. shows a fully differential circuit for detecting and processing of the incoming optical signals.

With reference to FIG. 5 there is shown a preferred embodiment of the present invention where the separate transimpedance pre-amplifiers, 303 and 304, and the differential electrical amplifier, 305, of FIG. 3 are integrated together into one fully differential optical signal receiver circuit. Mismatches in the performance of these two single-ended pre-amplifiers, 303 and 304, can degrade the common mode rejection properties of the differential amplifier 305. For example, supply noise might be amplified unequally by the two single-ended pre-amplifiers, 303 and 304, and thereby give rise to an interference signal present in the differential outputs. By combining the transimpedance amplifiers, 303 and 304, with the differential amplifier 305, better circuit matching characteristics are obtained and the susceptibility to noise and interference is further reduced.

Differential optical signals 501 and 502 are incident on a differential optical detector formed by the two photodetectors 503 and 504, respectively, which are connected to +Vdet. The FETs Q1–Q5 define a differential amplifier, with Q1 and Q2 as the input circuits, Q3 and Q4 the respective load impedances and Q5 as the common source impedance (current source). The FETs Q9 and Q10 acting as feedback elements to form a differential transimpedance receiver out of differential amplifier Q1 and Q2 which receives the input differential photocurrent signals from photodetectors 503 and 504. The voltages Vtune1 and Vtune2 are used to adjust the transimpedance levels of Q9 and Q10. The photocurrent signals are amplified by the differential transimpedance receiver (also referred to as a differential electric circuit) and differential voltage outputs are provided at Out and Out(bar). To provide stable biasing of the amplifier load elements, Q6–Q8 form a replica biasing network for loads Q3 and Q4. This insures that noise and interference signals on the supply and ground leads are further canceled in the circuits.

It should be noted that our differential optical signal receiver of 5 may operate with either a received asynchronous or synchronous differential input optical signal. Our illustrative examples employ asynchronous amplifiers, that is, they will amplify signals regardless of their timing relationship (i.e., they can be synchronous or asynchronous) without requiring a clock signal. Clocked amplifiers can also be employed by clocking various elements of the amplifier in a well known manner.

Thus, what has been described is merely illustrative of the application of the principles of the present invention. Other arrangements and methods can be implemented by those skilled in the art without departing from the spirit and scope of the present invention.

Appendix
References
[1] Bakoglu, H. B. Circuits, *Interconnections, and Packaging for VLSI*. Reading MA: Addison-Wesley; 1990; ISBN: 0-201-06008-6.
[2] Krishnamoorthy, A. V, , Miller, D. A. B, "Scaling Optoelectronic-VLSI Circuits into the 21st Century: A Technology Roadmap", *IEEE J. Spec. Topics in Quant. Electr.*, v.2, no.1, pp. 55–76, 1996.
[3] Lentine, A. L., et. al., "Optoelectronic VLSI Switching Chip with Greater than 1 Terabit per second potential I/O Bandwidth" *Electronics Left*. v. 33 pp 894–895, 1997.
[4] Sedra, A. S.; Smith, K. C.; *Microelectronic Circuits*: Harcourt Brace, 1991 ISBN 0-03-05-1648-X.
[5] Weste, Neil H. E.; Eshraghian, Kamran. *Principles of CMOS VLSI Design: A Systems Perspective*, 2nd. Edition. Reading, MA: Addison-Wesley; 1993; ISBN: 0-201-53376-6.
[6] Williams, G. Lightwave Receivers. *Topics in Lightwave Systems*. Li, Tingye ed. : Academic Press; 1991: 79–148. ISBN: 0-12-447302-4.
[7] Woodward, T. K., U.S. Pat. No. 5,644,418 "Smart Pixel Optical Receiver Employing Sense Amplifier and Method of Operation Thereof".

What is claimed is:

1. A differential optical signal receiver comprising
   a differential optical signal detector for detecting a received differential optical signal and converting it to a differential electrical signal and
   a differential electrical circuit, including a common source load, for processing said differential electrical signal so as to reiect electrical interference signals other than said differential electrical signal, wherein the differential electrical circuit includes a differential transimpedance preamplifier connected to receive and amplify the differential electrical signal.

2. The differential optical signal receiver of claim 1 wherein the differential electrical circuit further includes a differential amplifier circuit connected to receive output signals from the differential transimpedance preamplifier.

3. The differential optical signal receiver of claim 2 wherein the differential electrical circuit and the differential amplifier circuit are dc coupled.

4. The differential optical signal receiver of claim 2 wherein the differential electrical circuit and the differential amplifier circuit are integrated together on a common integrated circuit chip.

5. The differential optical signal receiver of claim 2 further including a differential post-amplifier connected to receive differential output signals from the differential amplifier circuit.

6. The differential optical signal receiver of claim 5 further including a differential channel filter connected to receive differential output signals from the differential post-amplifier.

7. The differential optical signal receiver of claim 6 further including a differential decision circuit connected to receive differential output signals from the differential channel filter.

8. The differential optical signal receiver of claim 1 wherein the differential electrical circuit and the differential optical signal detector are dc coupled.

9. The differential optical signal receiver of claim 1 wherein the differential electrical circuit and the differential optical signal detector are integrated together on a common integrated circuit chip.

10. The differential optical signal receiver of claim 1 wherein the received differential optical signal is an asynchronous signal.

11. The differential optical signal receiver of claim 1 wherein the differential electrical circuit is implemented using a VLSI circuit technology.

12. The differential optical signal receiver of claim 11 wherein the differential electrical circuit is implemented using CMOS VLSI technology.

13. A differential optical signal receiver comprising
   a differential optical signal detector for detecting a received differential optical signal and converting it to a differential electrical signal and
   a differential electrical circuit, including a common source load, for processing said differential electrical signal so as to reject electrical interference signals other than said differential electrical signal, wherein the received differential optical signal is a synchronous signal and the differential optical signal receiver is clocked at the rate of the synchronous signal.

14. A differential optical signal receiver comprising a differential optical signal detector for detecting a received differential optical signal and converting it to a differential electrical signal and a differential electrical circuit, including a common source load, for processing said differential electrical signal so as to reiect electrical interference signals other than said differential electrical signal, wherein the differential electrical circuit, includes a differential amplifier circuit having a diode load impedance for each amplifier of the differential amplifier.

15. A differential optical signal receiver comprising a differential optical signal detector for detecting a received differential optical signal and converting it to a differential electrical signal and a differential electrical circuit, including a common source load, for processing said differential electrical signal so as to reiect electrical interference signals other than said differential electrical signal, wherein the differential electrical circuit, includes a differential amplifier circuit having a cascode circuit as a load impedance for each amplifier of the differential amplifier.

* * * * *